(12) United States Patent
Oh et al.

(10) Patent No.: US 9,513,421 B2
(45) Date of Patent: Dec. 6, 2016

(54) MULTILAYERED OPTICAL FILM, MANUFACTURING METHOD THEREOF, AND DISPLAY DEVICE

(71) Applicants: SAMSUNG ELECTRONICS CO., LTD., Suwon-si, Gyeonggi-do (KR); CHEIL INDUSTRIES INC., Gumi-si, Gyeongsangbuk-do (KR)

(72) Inventors: Kyoung Ah Oh, Euiwang-si (KR); Hyung Jun Kim, Suwon-si (KR); Moon Yeon Lee, Euiwang-si (KR); Myung Sup Jung, Seongnam-si (KR)

(73) Assignees: SAMSUNG ELECTRONICS CO., LTD. (KR); CHEIL INDUSTRIES INC. (KR)

( * ) Notice: Subject to any disclaimer, the term of this patent is extended or adjusted under 35 U.S.C. 154(b) by 35 days.

(21) Appl. No.: 13/891,460

(22) Filed: May 10, 2013

(65) Prior Publication Data
US 2014/0334001 A1 Nov. 13, 2014

(30) Foreign Application Priority Data
May 10, 2013 (KR) .................. 10-2013-0053270

(51) Int. Cl.
*G02F 1/03* (2006.01)
*G02F 1/07* (2006.01)
(Continued)

(52) U.S. Cl.
CPC .................. *G02B 5/3083* (2013.01)

(58) Field of Classification Search
CPC .............. G02F 2001/133541; G02F 1/133528; G02F 1/13363; G02F 2001/133638; G02F 2202/40; G02F 2413/03; G02F 2413/08; G02F 2413/01; G02F 2413/11; G02F 2413/12; G02F 2413/13; G02F 2201/50; G02B 5/3083; G02B 5/3016; G02B 5/3025; G02B 5/3033; G02B 5/1809; G02B 27/26; G02B 27/286
(Continued)

(56) References Cited

U.S. PATENT DOCUMENTS 5,504,603 A * 4/1996 Winker et al. ............. 349/117
5,929,946 A * 7/1999 Sharp et al. ................ 349/18
(Continued)

FOREIGN PATENT DOCUMENTS

| JP | 02-120804 | 5/1990 |
|---|---|---|
| JP | 10311904 | 11/1998 |

(Continued)

OTHER PUBLICATIONS

Korean Office Action—Korean Application No. 10-2013-0053270 dated Dec. 8, 2015.

*Primary Examiner* — Bumsuk Won
*Assistant Examiner* — Collin X Beatty
(74) *Attorney, Agent, or Firm* — Cantor Colburn LLP

(57) ABSTRACT

An embodiment of an optical film includes: a polarization layer; a first phase retardation layer; a second phase retardation layer; and a light blocking layer disposed between the first phase retardation layer and the second phase retardation layer and extending along a circumference of the second phase retardation layer, wherein the polarization layer is disposed on the first phase retardation, the first phase retardation layer is disposed on the second phase retardation layer, an in-plane retardation value of the first phase retardation layer at a standard wavelength of about 550 nanometers is in a range from about 240 nanometers to about 300 nanometers, and an in-plane retardation value of the second phase retardation layer at the standard wavelength is in a range from about 110 nanometers to about 160 nanometers.

20 Claims, 16 Drawing Sheets

(51) Int. Cl.
*G02B 5/30* (2006.01)
*G02B 27/28* (2006.01)

(58) Field of Classification Search
USPC .... 359/489.01–489.07, 489.15; 349/96, 194; 264/1.34; 355/71
See application file for complete search history.

(56) References Cited

U.S. PATENT DOCUMENTS

| | | | |
|---|---|---|---|
| 6,072,629 A * | 6/2000 | Fan et al. | 359/489.07 |
| 6,344,887 B1 * | 2/2002 | Ma et al. | 349/98 |
| 7,169,447 B2 * | 1/2007 | Su Yu et al. | 428/1.1 |
| 8,134,659 B2 * | 3/2012 | Takahashi et al. | 349/96 |
| 8,237,900 B2 | 8/2012 | Itadani et al. | |
| 2002/0130997 A1 * | 9/2002 | Yano et al. | 349/119 |
| 2003/0210365 A1 * | 11/2003 | Koyama et al. | 349/113 |
| 2004/0080691 A1 * | 4/2004 | Mi et al. | 349/117 |
| 2004/0184019 A1 * | 9/2004 | Totzeck | G02B 5/1809 355/71 |
| 2005/0057714 A1 | 3/2005 | Jeon et al. | |
| 2007/0054066 A1 * | 3/2007 | Usukura et al. | 428/1.31 |
| 2007/0154654 A1 * | 7/2007 | Greener et al. | 428/1.1 |
| 2007/0247633 A1 * | 10/2007 | Oto | 356/487 |
| 2008/0309854 A1 * | 12/2008 | Ge et al. | 349/98 |
| 2009/0068472 A1 | 3/2009 | Umemoto et al. | |
| 2009/0096970 A1 | 4/2009 | Sakai et al. | |
| 2009/0103016 A1 | 4/2009 | Shutou et al. | |
| 2009/0128758 A1 * | 5/2009 | Mori et al. | 349/118 |
| 2009/0135343 A1 * | 5/2009 | Kitamura et al. | 349/96 |
| 2009/0161044 A1 * | 6/2009 | Ge et al. | 349/98 |
| 2009/0161045 A1 * | 6/2009 | Kawamoto et al. | 349/98 |
| 2009/0237601 A1 * | 9/2009 | Shutou et al. | 349/118 |
| 2009/0290100 A1 * | 11/2009 | Haruta et al. | 349/75 |
| 2010/0026936 A1 * | 2/2010 | Uesaka et al. | 349/75 |
| 2010/0026939 A1 * | 2/2010 | Shibuta et al. | 349/96 |
| 2010/0060816 A1 * | 3/2010 | Fukai et al. | 349/58 |
| 2010/0245725 A1 * | 9/2010 | Kaihoko et al. | 349/96 |
| 2010/0253884 A1 * | 10/2010 | Katou et al. | 349/96 |
| 2011/0103036 A1 * | 5/2011 | Bosl et al. | 362/19 |
| 2012/0026433 A1 * | 2/2012 | Lee et al. | 349/96 |

FOREIGN PATENT DOCUMENTS

| | | |
|---|---|---|
| JP | 2006-527394 | 11/2006 |
| KR | 10-2002-0058272 | 7/2002 |
| KR | 10-2007-0104622 | 10/2007 |
| KR | 10-2008-0029069 | 4/2008 |
| KR | 1020080035592 | 4/2008 |
| KR | 10-2008-0047400 | 5/2008 |
| KR | 10-2008-0049325 | 6/2008 |
| KR | 10-2008-0071150 | 8/2008 |
| KR | 1020090028574 | 3/2009 |
| KR | 10-2010-0078259 | 7/2010 |
| KR | 1020100130975 | 12/2010 |
| KR | 10-2012-0035061 | 4/2012 |
| KR | 10-2012-0065748 | 6/2012 |

* cited by examiner

MULTILAYERED OPTICAL FILM, MANUFACTURING METHOD THEREOF, AND DISPLAY DEVICE

CROSS-REFERENCE TO RELATED APPLICATIONS

This application claims priority to Korean Patent Application No. 10-2013-0053270, and all the benefits accruing therefrom under 35 U.S.C. §119, the content of which in its entirety is herein incorporated by reference.

BACKGROUND (a) Field

Provided is an optical film, and in particular, a multilayered optical film, a manufacturing method of the optical film, and a display device including the optical film.

(b) Description of the Related Art

Flat panel displays may be classified into an emitting display device that emits light by itself and a non-emitting display device that uses separate light sources. An optical compensation film such as a phase difference film may be used for improving image quality of the flat panel displays.

In the emitting display device, for example, an organic light emitting display, visibility and contrast ratio may be decreased due to reflection of external light by metal such as an electrode in the display device. In the emitting display device, a polarizing plate and a phase difference film may be used to effectively prevent the external light reflected in the display device from leaking out of the display device.

In a liquid crystal display ("LCD"), which is a type of non-emitting display device, reflection of external light and sunglass effect may be reduced by converting linear polarization into circular polarization based on the types of the LCD including a transmissive type, a transflective type, and a reflective type, thereby improving the image quality of the LCD.

A flat panel display includes bezel covering periphery of a screen, and the bezel may thicken the flat panel display. Therefore, flat panel displays without bezel is studied.

SUMMARY

An embodiment of an optical film includes: a polarization layer; a first phase retardation layer; a second phase retardation layer; and a light blocking layer disposed between the first phase retardation layer and the second phase retardation layer and extending along a circumference of the second phase retardation layer, wherein the polarization layer is disposed on the first phase retardation, the first phase retardation layer is disposed on the second phase retardation layer, an in-plane retardation value of the first phase retardation layer at a standard wavelength of about 550 nanometers is in a range from about 240 nanometers to about 300 nanometers, and an in-plane retardation value of the second phase retardation layer at the standard wavelength is in a range from about 110 nanometers to about 160 nanometers.

In an embodiment, the optical film may further include an adhesive layer disposed between the first phase retardation layer and the second phase retardation layer and between the first phase retardation layer and the light blocking layer.

In an embodiment, the light blocking layer may have a thickness less than a thickness of the adhesive layer.

In an embodiment, the thickness of the light blocking layer may be equal to or greater than about 3 micrometers and less than about 10 micrometers, and the thickness of the adhesive layer may be in a range from about 10 micrometers to about 20 micrometers.

In an embodiment, the in-plane retardation value of the first phase retardation layer at the standard wavelength may be in a range from about 260 nanometers to about 280 nanometers, and the in-plane retardation value of the second phase retardation layer at the standard wavelength may be in a range from about 130 nanometers to about 140 nanometers.

In an embodiment, an out-of-plane retardation value of the first phase retardation layer at the standard wavelength and an out-of-plane retardation value of the second phase retardation layer at the standard wavelength may have opposite signs.

In an embodiment, the out-of-plane retardation value of the first phase retardation layer at the standard wavelength may be in a range from about 200 nanometers to about 230 nanometers, and the out-of-plane retardation value of the second phase retardation layer at the standard wavelength may be in a range from about −120 nanometers to about −90 nanometers.

In an embodiment, the first phase retardation layer may have an optic axis at an angle in a range from about 17 degrees to about 27 degrees or from about −27 degrees to about −17 degrees with respect to a transmission axis of the polarization layer, and the first phase retardation layer may have an optic axis at an angle in a range from about 85 degrees to about 95 degrees with respect to the transmission axis of the polarization layer.

In an embodiment, the first phase retardation layer may have a short-wavelength dispersion value in a range from about 1.00 to about 1.05, the second phase retardation layer may have a short-wavelength dispersion value in a range from about 1.00 to about 1.20, the first phase retardation layer may have a long-wavelength dispersion value in a range from about 0.95 to about 1.00, and the second phase retardation layer may have a long-wavelength dispersion value in a range from about 0.85 to about 1.00.

At least one of the first phase retardation layer and the second phase retardation layer may include at least one of a cyclo-olefin polymer, polyacrylate, polycarbonate, polystyrene, polyethylene terephthalate and a cellulose-based polymer.

In an embodiment, the polarization layer may include a first roll film extending in a first direction substantially perpendicular to the transmission axis, the first phase retardation layer may include a second roll film extending in the first direction, having an optic axis at an angle in a range from about 17 degrees to about 27 degrees or from about −27 degrees to about −17 degrees with respect to a second direction substantially perpendicular to the first direction, and disposed on the first roll film, and the second phase retardation layer may include a third roll film extending in the first direction, having an optic axis at an angle in a range from about 85 degrees to about 95 degrees with respect to the second direction, and disposed on the second roll film.

A method of manufacturing an optical film includes: laminating a passivation roll film and a half-wave roll film on respective surfaces of a polarization roll film to form a first laminated film; printing a light blocking layer on a quarter-wave roll film; and laminating the first laminated film and the quarter-wave roll film with the light blocking layer by a roll-to-roll process such that the light blocking layer may be disposed between the half-wave roll film and the quarter-wave roll film.

In an embodiment, the method may further include: coating an adhesive layer on the half-wave roll film in the first laminated film, wherein the first laminated film and the quarter-wave roll film with the light blocking layer may be laminated with the adhesive layer.

In an embodiment, the light blocking layer may have a thickness less than a thickness of the adhesive layer.

In an embodiment, the thickness of the light blocking layer may be equal to or greater than about 3 micrometers and less than about 10 micrometers, and the thickness of the adhesive layer may be in a range from about 10 micrometers to about 20 micrometers.

In an embodiment, the method may further include: stretching the half-wave roll film in a direction at an angle in a range from about 17 degrees to about 27 degrees or from about −27 degrees to about −17 degrees with respect to a direction substantially perpendicular to a proceeding direction of the half-wave roll film; and stretching the quarter-wave roll film in a direction at an angle in a range from about 85 degrees to about 95 degrees with respect to a direction substantially perpendicular to a proceeding direction of the quarter-wave roll film.

An out-of-plane retardation value of the stretched half-wave roll film at the standard wavelength and an out-of-plane retardation value of the stretched quarter-wave roll film at the standard wavelength may have opposite signs.

A display device includes: a display panel; and an optical film disposed on the display panel, wherein the optical film includes: a polarization layer; a first phase retardation layer; a second phase retardation layer; and a light blocking layer disposed between the first phase retardation layer and the second phase retardation layer and extending along a circumference of the second phase retardation layer, wherein the polarization layer may be disposed on the first phase retardation, the first phase retardation layer may be disposed on the second phase retardation layer, an in-plane retardation value of the first phase retardation layer at a standard wavelength of about 550 nanometers may be in a range from about 240 nanometers to about 300 nanometers, and an in-plane retardation value of the second phase retardation layer at the standard wavelength may be in a range from about 110 nanometers to about 160 nanometers.

In an embodiment, the display device may further include an adhesive layer disposed between the first phase retardation layer and the second phase retardation layer and between the first phase retardation layer and the light blocking layer.

In an embodiment, the light blocking layer may have a thickness equal to or greater than about 3 micrometers and less than a thickness of the adhesive layer.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The above and other features of the invention will become more apparent by describing in further detail exemplary embodiments thereof with reference to the accompanying drawings, in which.

DETAILED DESCRIPTION

Figure 1:
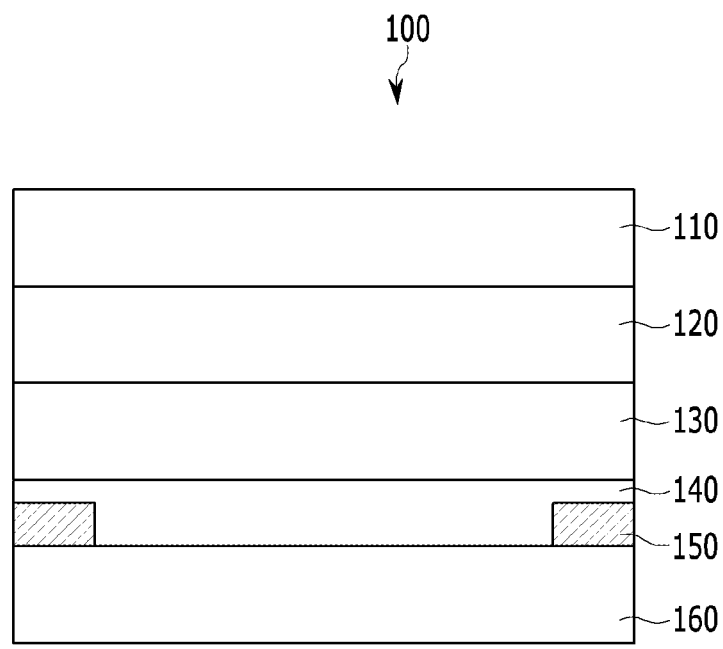
FIG. 1 is a schematic sectional view of an embodiment of an optical film for a display device according to the invention.

The invention will be described more fully hereinafter with reference to the accompanying drawings, in which embodiments of the invention are shown. This invention may, however, be embodied in many different forms, and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will be understood that when an element or layer is referred to as being "on," "connected to" or "coupled to" another element or layer, the element or layer can be directly on, connected or coupled to the other element or layer or intervening elements or layers may be present. In contrast, when an element is referred to as being "directly on," "directly connected to" or "directly coupled to" another element or layer, there are no intervening elements or layers present. Like numbers refer to like elements throughout. As used herein, the term "and/or" includes any and all combinations of one or more of the associated listed items.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the invention.

Spatially relative terms, such as "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation, in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "includes" and/or "including," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Embodiments of the invention are described herein with reference to cross-section illustrations that are schematic illustrations of idealized embodiments (and intermediate structures) of the invention. As such, variations from the shapes of the illustrations as a result, for example, of manufacturing techniques and/or tolerances, are to be expected. Thus, embodiments of the invention should not be construed as limited to the particular shapes of regions illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the claims set forth herein.

All methods described herein can be performed in a suitable order unless otherwise indicated herein or otherwise clearly contradicted by context. The use of any and all examples, or exemplary language (e.g., "such as"), is intended merely to better illustrate the invention and does not pose a limitation on the scope of the invention unless otherwise claimed. No language in the specification should be construed as indicating any non-claimed element as essential to the practice of the invention as used herein.

Hereinafter, embodiments of the invention will be described in further detail with reference to the accompanying drawings.

An embodiment of an optical film for a display device is described in detail with reference to FIG. 1 to FIG. 7.

Figure 2:
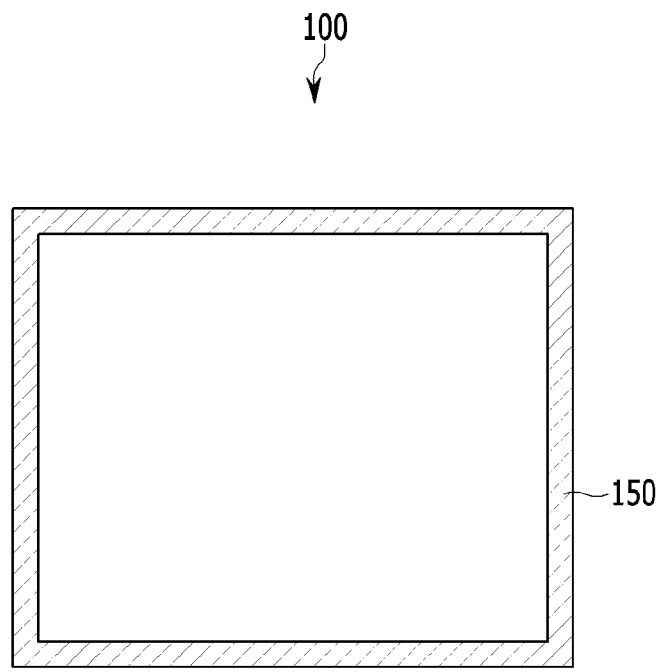
FIG. 2 is a schematic plane view of the optical film shown in FIG. 1.
Figure 3:
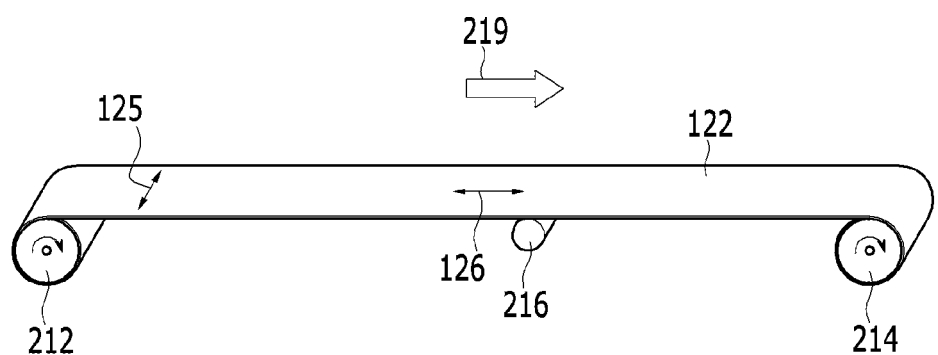
FIG. 3 is a schematic perspective view illustrating an embodiment of roll-to-roll stretching a polarization layer.
Figure 4:
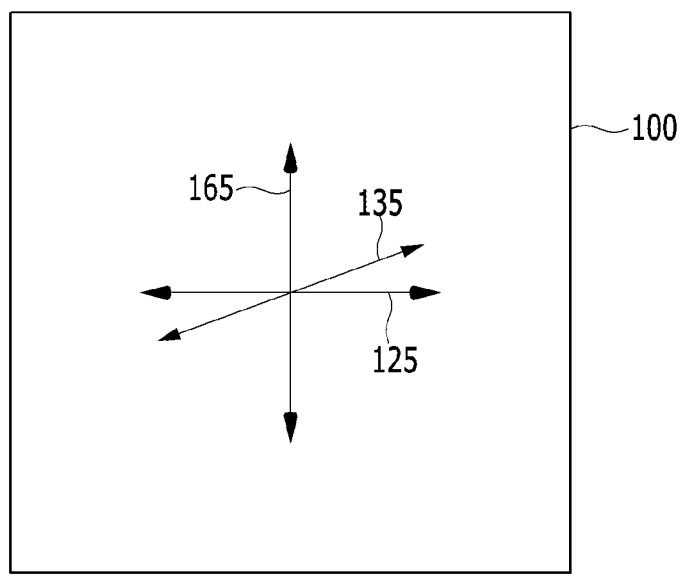
FIG. 4 illustrates a transmission axis of a polarization layer, an optic axis of a first phase retardation layer, and an optic axis of a second phase retardation layer.
Figure 5:
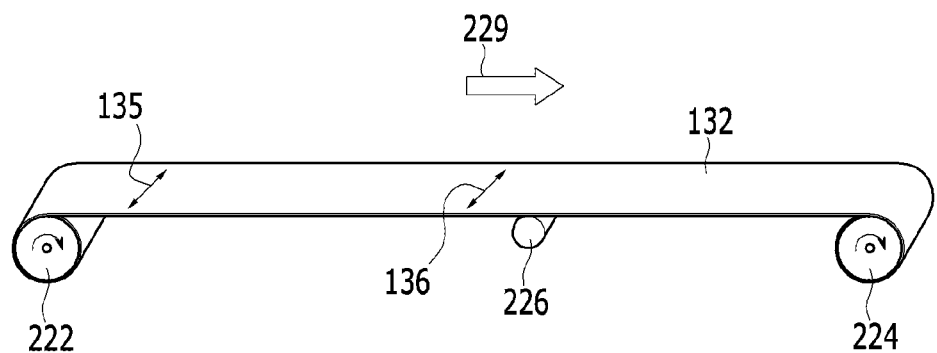
FIG. 5 is a schematic perspective view illustrating an embodiment of roll-to-roll stretching a first phase retardation layer.
Figure 6:
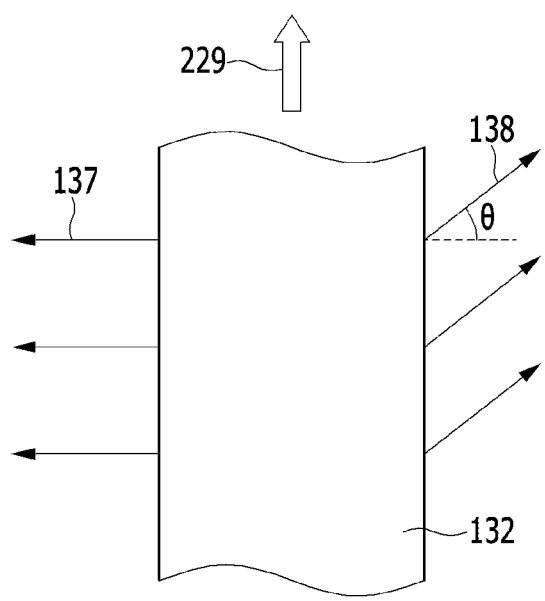
FIG. 6 is a schematic plan view illustrating an embodiment of oblique stretching of a first phase retardation layer.
Figure 7:
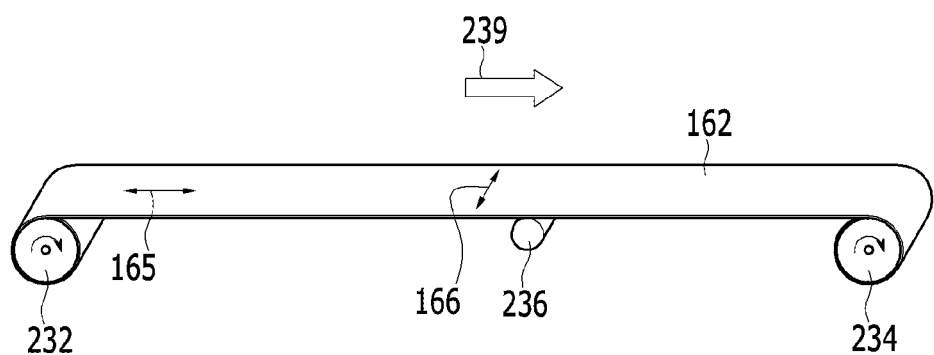
FIG. 7 is a schematic perspective view illustrating an embodiment of roll-to-roll stretching a second phase retardation layer.

FIG. 1 is a schematic sectional view of an embodiment of an optical film for a display device according to the invention, FIG. 2 is a schematic plane view of the optical film shown in FIG. 1, FIG. 3 is a schematic perspective view illustrating an embodiment of roll-to-roll stretching a polarization layer, FIG. 4 illustrates a transmission axis of a polarization layer, an optic axis of a first phase retardation layer, and an optic axis of a second phase retardation layer, FIG. 5 is a schematic perspective view illustrating an embodiment of roll-to-roll stretching a first phase retardation layer, FIG. 6 is a schematic plan view illustrating an embodiment of oblique stretching of a first phase retardation layer, and FIG. 7 is a schematic perspective view illustrating an embodiment of roll-to-roll stretching a second phase retardation layer.

Referring to FIG. 1, an embodiment of an optical film 100 for a display device includes a passivation layer 110, a polarization layer 120, a first phase retardation layer 130, a first adhesive layer 140, a light blocking layer 150, and a second phase retardation layer 160. In one embodiment, for example, the polarization layer 120 may be disposed between the passivation layer, the first phase retardation layer 130 and the second phase retardation layer 160 may be stacked from top to bottom. In an alternative embodiment, the optical film 100 may further include an additional layer (not shown) disposed on the polarization layer 120, and the additional layer may protect the polarization layer 120 or may reduce or inhibit reflection or dazzling of light.

In one embodiment, the polarization layer 120 may be disposed between the passivation layer 110 and the first phase retardation layer 130, and may adhere to the passivation layer 110 and the first phase retardation layer 130 with thin adhesives (not shown). The first adhesive layer 140 may be disposed between the first phase retardation layer 130 and the second phase retardation layer 160, and may bind the first phase retardation layer 130 to the second phase retardation layer 160.

The light blocking layer 150 may be disposed between the second phase retardation layer 160 and the first adhesive layer 140, and, referring to FIG. 2, may extend along a circumference of the optical film 100 in a band shape. In an alternative embodiment, the light blocking layer 150 may be disposed between the first phase retardation layer 130 and the first adhesive layer 140. Each of the first phase retardation layer 130 and the second phase retardation layer 160 may occupy a predetermined area, and the light blocking layer 150 may have a pattern having a predetermined thickness and extending along edges of the first phase retardation layer 130 and the second phase retardation layer 160. The light blocking layer 150 may include an opaque material, for example, a black material. In an embodiment, the light blocking layer 150 may include black ink, and may be printed on a surface of the second phase retardation layer 160. In an embodiment, the light blocking layer 150 may be printed by means of gravure or rotogravure printing.

The first adhesive layer 140 may stick the first phase retardation layer 130 to the second phase retardation layer 160, and may include a pressure sensitive adhesive (PSA), for example, an epoxy resin.

In an embodiment, a thickness of the first adhesive layer 140 may range from about 10 μm to about 20 μm. When the thickness of the first adhesive layer 140 is smaller than about 10 μm, the strength of the adhesion may be weakened to cause defects in the adhesion between the first phase retardation layer 130 and the second phase retardation layer 160. When the thickness of the first adhesive layer 140 is greater than about 20 μm, the thickness of the optical film 100 may be so thick to cause deterioration of optical properties of the optical film 100. A thickness of the light blocking layer 150 may be smaller than the thickness of the first adhesive layer 140, and, for example, may be equal to or greater than about 3 μm and smaller than about 10 μm. When the thickness of the light blocking layer 150 is less than about 3 μm, a desired black color of the light blocking layer 150 may not be achieved. When the thickness of the light blocking layer 150 is equal to or greater than about 10 μm, the first adhesive layer 140 may become relatively thin to weaken the adhesive strength of the first adhesive layer 140.

The polarization layer 120 may be a linear polarizer configured to convert the polarization of incident light into linear polarization, and may include poly-vinyl alcohol ("PVA") doped with iodine, for example.

In an embodiment, the polarization layer 120 may be formed by roll-to-roll stretching. Referring to FIG. 3, for example, an iodine-doped PVA film 122 may be rolled around a roll 212, and the rolled PVA film 122 may be unrolled to proceed in a direction. The PVA film 122 may be stretched in the proceeding direction (a "longitudinal direction," or a "machine direction (MD)") 219, and may be rolled again around another roll 214 to form a rolled film 122 of the polarization layer 120 having a transmission axis 125 in a direction (a "width direction" or a "transverse direction (TD)") substantially perpendicular to the proceeding direction 219. In FIG. 3, reference numeral 126 denotes a stretching direction, and reference numeral 216 denotes an auxiliary roll supporting the PVA film 122 to be flat.

The passivation layer 110 is configured to protect the polarization layer 120, and may include triacetyl cellulose ("TAC"), for example. The passivation layer 110 may have characteristics of anti-reflection, low-reflection, anti-glare or hard coating, for example.

In an embodiment, the first phase retardation layer 130 may be a half-wave plate, and the second phase retardation layer 160 may be a quarter-wave plate. A stack of a quarter-wave plate and a half-wave plate may function as a circular polarization film.

In an embodiment, the first phase retardation layer 130 may have an in-plane retardation value in a range from about 240 nanometers (nm) to about 300 nm at a wavelength of about 550 nm, which will hereinafter be referred to as a "standard wavelength." In one embodiment, for example, the first phase retardation layer 130 may have an in-plane retardation value in a range from about 260 nm to about 280 nm at the standard wavelength. The in-plane retardation Re of a layer is generally given by the following equation: Re=$(n_x-n_y) \times d$, where d denotes a thickness of the layer, and $n_x$ and $n_y$ denote refractive coefficients in two orthogonal directions in a plane substantially perpendicular to a thickness direction of the layer. In such an embodiment, the phase retardation layer 120 may function as a half-wave plate.

In an embodiment, the second phase retardation layer 160 may have an in-plane retardation value in a range from about 110 nm to about 160 nm at the standard wavelength. In one embodiment, for example, the second phase retardation layer 160 may have an in-plane retardation value in a range from about 130 nm to about 140 nm at the standard wavelength. In such an embodiment, the second phase retardation layer 160 may functions as a quarter-wave plate.

In an embodiment, referring to FIG. 4, an angle between an optic axis 135 of the first phase retardation layer 130 and a transmission axis 125 of the polarization layer 120 may be in a range from about 17 degrees to about 27 degrees or from about −27 degrees to about −17 degrees. An angle between an optic axis 165 of the second phase retardation layer 160 and the transmission axis 125 of the polarization layer 120 may be in a range from about 85 degrees to about 95 degrees. An angle between the optic axis 135 of the first phase retardation layer 130 and the optic axis 165 of the second phase retardation layer 13 may be in a range from about 63 degrees to about 73 degrees or from about −63 degrees to about −73 degrees. In such an embodiment, an absorption axis of the polarization layer 120 is substantially perpendicular to the transmission axis 125 of the polarization layer 120, such that an angle between the optic axis 135 of the first phase retardation layer 130 and the absorption axis of the polarization layer 120 may be in a range from about 63 degrees to about 73 degrees or from about −73 degrees to about −63 degrees, and an angle between the optic axis 165 of the second phase retardation layer 160 and the absorption axis of the polarization layer 120 may be in a range from about −5 degrees to about 5 degrees.

An optical film including a half-wave plate and a quarter-wave plate may convert linear polarization into circular polarization when the optical film satisfies a relation $\theta_1 = 2\theta_0 + 45°$, where $\theta_0$ denotes an angle between a slow axis of the half-wave plate and a predetermined reference direction, and $\theta_1$ denotes an angle between a slow axis of the quarter-wave plate and the predetermined reference direction.

As described above, an embodiment of the optical film may be provided, e.g., formed, by stacking the first phase retardation layer 130 of a half-wave plate and the second phase retardation layer 160 of a quarter-wave plate with the above-described angle such that the optical film functions as a circular polarization film.

According to an embodiment, an out-of-plane retardation value of the first phase retardation layer 130 and an out-of-plane retardation value of the second phase retardation layer 160 at the standard wavelength may have opposite signs. In one embodiment, for example, the out-of-plane retardation value of the first phase retardation layer 130 at the standard wavelength may be a positive value, and the out-of-plane retardation value of the second phase retardation layer 160 at the standard wavelength may be a negative value. The out-of-plane retardation Rth of a layer is generally given by the following equation: Rth=$\{[(n_x+n_y)/2]-n_z\} \times d$, where d denotes the thickness of the layer, $n_z$ denotes a refractive coefficient in the thickness direction of the layer, and $n_x$ and $n_y$ denote refractive coefficients in two orthogonal directions in a plane substantially perpendicular to the thickness direction of the layer.

According to an embodiment, an out-of-plane retardation value of the first phase retardation layer 130 at the standard wavelength may be in a range from about zero (0) nm to about 300 nm. In one embodiment, for example, the out-of-plane retardation value of the first phase retardation layer 130 at the standard wavelength may be in a range from about 130 nm to about 250 nm. In one embodiment, for example, the out-of-plane retardation value of the first phase retardation layer 130 at the standard wavelength may be in a range from about 200 nm to about 230 nm. An out-of-plane retardation value of the second phase retardation layer 160 at the standard wavelength may be in a range from about −160 nm to about zero (0) nm. In one embodiment, for example, the out-of-plane retardation value of the second phase retardation layer 160 at the standard wavelength may be in a range from about −130 nm to about −50 nm. In one embodiment, for example, the out-of-plane retardation value of the second phase retardation layer 160 at the standard wavelength may be in a range from about −120 nm to about −90 nm.

According to an embodiment, an absolute value of the out-of-plane retardation of the first phase retardation layer 130 at the standard wavelength may be substantially equal to or less than about 300 nm, and an absolute value of the out-of-plane retardation of the second phase retardation layer 160 at the standard wavelength may be substantially equal to or less than about 160 nm.

According to an embodiment, the first phase retardation layer 130 may have a short-wavelength dispersion value in a range from about 1.00 to about 1.05, and the second phase retardation layer 160 may have a short-wavelength dispersion value in a range from about 1.00 to about 1.20. The short-wavelength dispersion value of the first or second phase retardation layer 130 or 160 is defined as a ratio of a retardation value of the first or second phase retardation layer 130 or 160 at a wavelength of about 450 nm with respect to a retardation value of the first or second phase retardation layer 130 or 160 at the standard wavelength.

According to an embodiment, the first phase retardation layer 130 may have a long-wavelength dispersion value in a range from about 0.95 to about 1.00, and the second phase retardation layer 160 may have a long-wavelength dispersion value in a range from about 0.85 to about 1.00. The long-wavelength dispersion value of the first or second phase retardation layer 130 or 160 is defined as a ratio of a retardation value of the first or second phase retardation layer 130 or 160 at a wavelength of about 650 nm with respect to a retardation value of the first or second phase retardation layer 130 or 160 at the standard wavelength.

According to an embodiment, at least one of the first phase retardation layer 130 and the second phase retardation layer 160 may include at least one of a cyclo-olefin polymer, polyacrylate, polycarbonate ("PC"), polystyrene ("PST"), polyethylene terephthalate ("PET"), and polycellulose. In one embodiment, for example, the first phase retardation layer 130 may include a cyclo-olefin polymer, and the second phase retardation layer 160 may include polyacrylate. The first or second phase retardation layer 120 or 130 including at least one of PST, polyacrylate and polycellulose may have a negative value of the out-of-plane retardation at the standard wavelength.

According to an embodiment, at least one of the first phase retardation layer 130 and the second phase retardation layer 160 may be provided, e.g., formed, by stretching. At least two of the polarization layer 120, the first phase retardation layer 130 and the second phase retardation layer 160 may be stacked using a roll-to-roll processing.

According to an embodiment, the first phase retardation layer 130 may include a positively birefringent material that has a slow axis representing a maximum refractive coefficient in a stretching direction. In one embodiment, for example, the first phase retardation layer 130 may include at least one of a cyclo-olefin polymer, PC, PET and polycellulose.

In an embodiment, referring to FIG. 5, an unstretched film 132 including a positively birefringent material may be prepared and rolled around a roll 222 to provide, e.g., form, a rolled film. The rolled film 132 may be unrolled to proceed. The proceeding film 132 may be stretched substantially in a direction oblique to a transverse direction perpendicular to a proceeding direction, and may be rolled around another roll 224 again to form a rolled film 132 of the first phase retardation layer 130 having an oblique optic axis, e.g., an oblique slow axis. In FIG. 5, reference numeral 136 denotes a stretching direction, and reference numeral 226 denotes an auxiliary roll supporting the film 132 to be flat.

In an embodiment, referring to FIG. 6, the oblique stretching was performed such that an edge of the film 132 may be stretched in the transverse direction and an opposite edge of the film 132 may be stretched in the direction at an angle θ with respect to the transverse direction. Desired optical characteristics may not be obtained when the stretching angle θ is greater than about 27 degrees, or when the stretching angle θ is less than about −27 degrees.

In an embodiment, the oblique stretching may be performed with adjusting the stretching rate and the stretching temperature to obtain a predetermined in-plane retardation value and a predetermined out-of-plane retardation value and with adjusting the stretching direction such that the slow axis of the first phase retardation layer 130 may be at an angle in a range of from about 17 degrees to about 27 degrees or from about −27 degrees to about −17 degrees with respect to a direction substantially perpendicular to the proceeding direction of the proceeding film 132. A method of oblique stretching is disclosed in Korean Patent Application Publication No. 2008-0071150, the content of which in its entirety is herein incorporated by reference.

According to an embodiment, the second phase retardation layer 160 may include a negatively birefringent material that has a slow axis representing a maximum refractive coefficient in a direction substantially perpendicular to a stretching direction. In one embodiment, for example, the second phase retardation layer 160 may include a polymer including PST, acrylic polymer, PC, acrylate-styrene copolymer, and a combination of at least two of the above-listed materials.

In an embodiment, referring to FIG. 7, an unstretched film 162 including a negatively birefringent material may be prepared and rolled around a roll 232 to form a rolled film. The rolled film 162 may be unrolled and proceed in a direction. The proceeding film may be stretched in a transverse direction, and may be rolled again around another roll 234 to form a rolled film 162 of the second phase retardation layer 160 having a slow axis substantially parallel to the proceeding direction. In FIG. 7, reference numeral 166 denotes a stretching direction, and reference numeral 236 denotes an auxiliary roll supporting the film 162 to be flat.

In an embodiment, the stretching may be performed with adjusting the stretching rate and the stretching temperature to obtain a predetermined in-plane retardation value and a predetermined out-of-plane retardation value and with adjusting the stretching direction such that the slow axis of the second phase retardation layer 160 may be at an angle in a range of from about 85 degrees to about 95 degrees with respect to the proceeding direction of the proceeding film 162.

As described above, the optical film 100 according to an embodiment includes the light blocking layer 150 disposed between the first phase retardation layer 130 and the second phase retardation layer 160 and at a position of the first adhesive layer 140, thereby reducing the thickness of the optical film 100. In addition, the light blocking film 150 may be printed on the surface of the second phase retardation layer 160 by gravure printing, etc., which is applicable in a roll-to-roll process.

An embodiment of a method of manufacturing an optical film will be described in detail with reference to FIGS. 8-15.

FIGS. 8 to 15 are schematic diagrams illustrating an embodiment of a method of manufacturing an optical film by a roll-to-roll process.

A first phase retardation roll film 132 may be prepared by a process described above with reference to FIGS. 5 and 6. In an embodiment, a surface of the first phase retardation layer 130 may be primer treated with silicone particles to enhance the strength of adhesion in a following process.

A second phase retardation roll film 162 may be prepared by a process described above with reference to FIG. 7.

Figure 8:
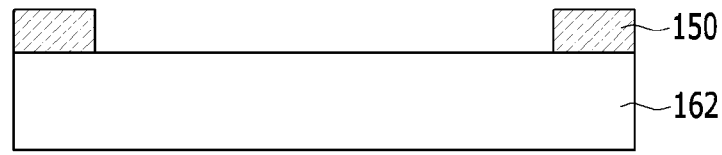
FIGS. 8 to 15 are schematic diagrams illustrating an embodiment of a method of manufacturing an optical film by a roll-to-roll process.
Figure 9:
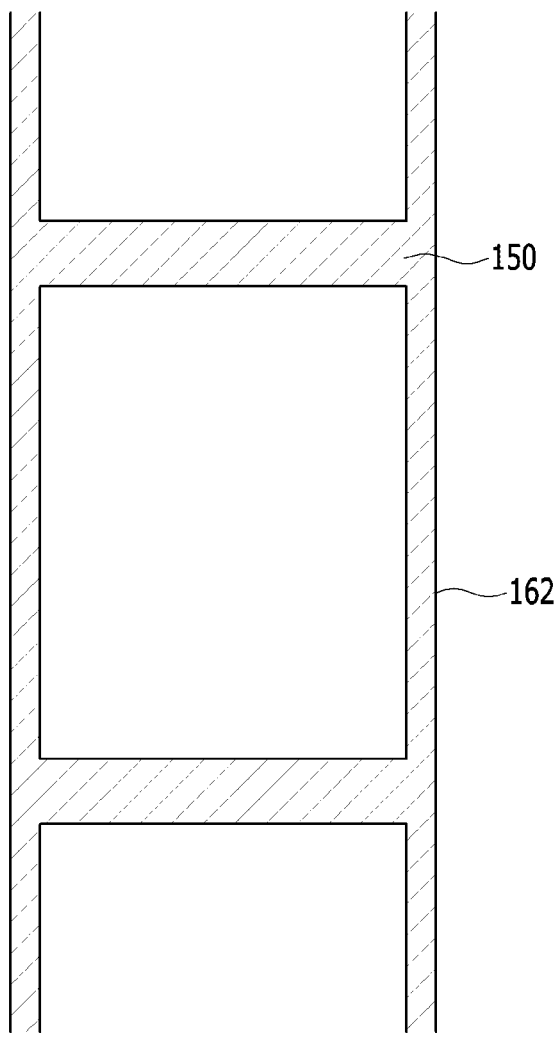

Referring to FIGS. 8 and 9, a light blocking layer 150 may be printed on a surface of the second phase retardation roll film 162. The light blocking layer 150 may be printed with black ink by gravure printing.

Figure 10:
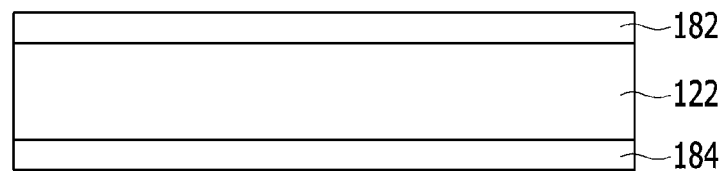

A polarization roll film 122 may be prepared by a process described above with reference to FIG. 3. Referring to FIG. 10, both surfaces of the polarization roll film 122 may be coated with adhesives 182 and 184. The adhesives 182 and 184 may include an aquatic adhesive, for example, an aquatic PVA solution.

Figure 11:
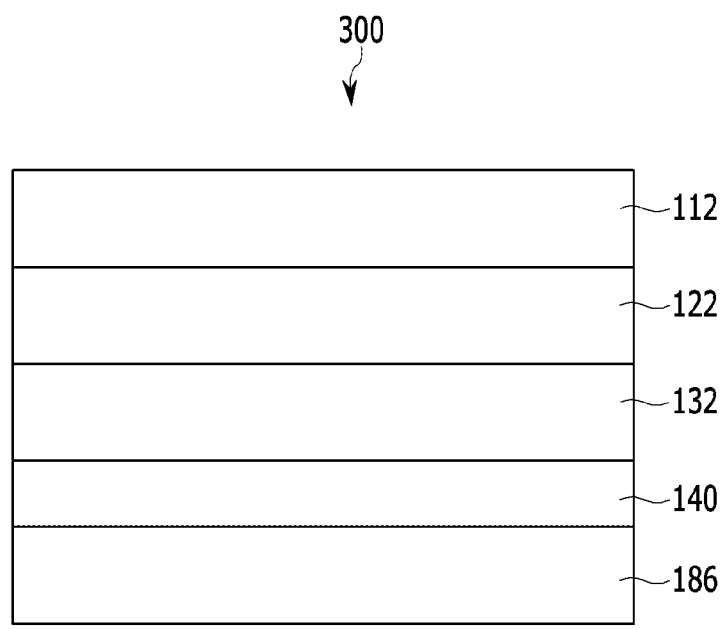

Referring to FIG. 11, the first phase retardation roll film 132 and a passivation roll film 112 may be attached to respective sides of the polarization roll film 122 with the adhesives 182 and 184 to form a first laminated film 300. The first phase retardation roll film 132 may be aligned such that the primer treated surface faces the polarization roll film 122. In an embodiment, a surface of the passivation roll film 112, which was attached to the polarization roll film 122, may be saponificated to introduce a hydrophilic group thereonto.

A surface opposite the primer-treated surface of the first phase retardation roll film 132 in the first laminated film 300 may be corona treated to enhance the strength of adhesion, and a first adhesive layer 140 may be deposited on the corona-treated surface of the first phase retardation roll film 132. Thereafter, a separator 186 may be attached to the first adhesive layer 140.

Figure 12:
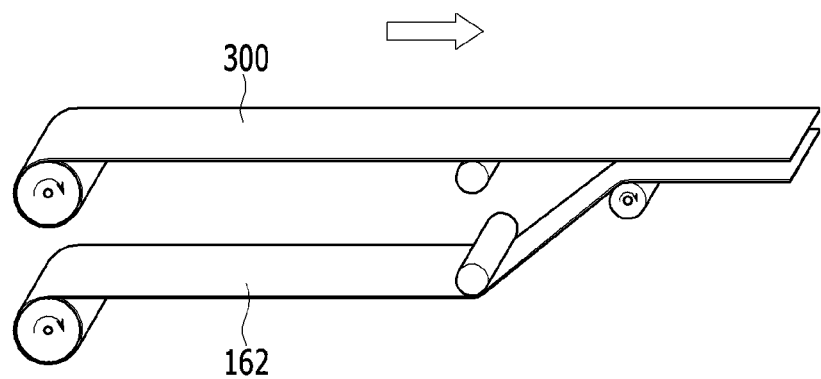
Figure 13:
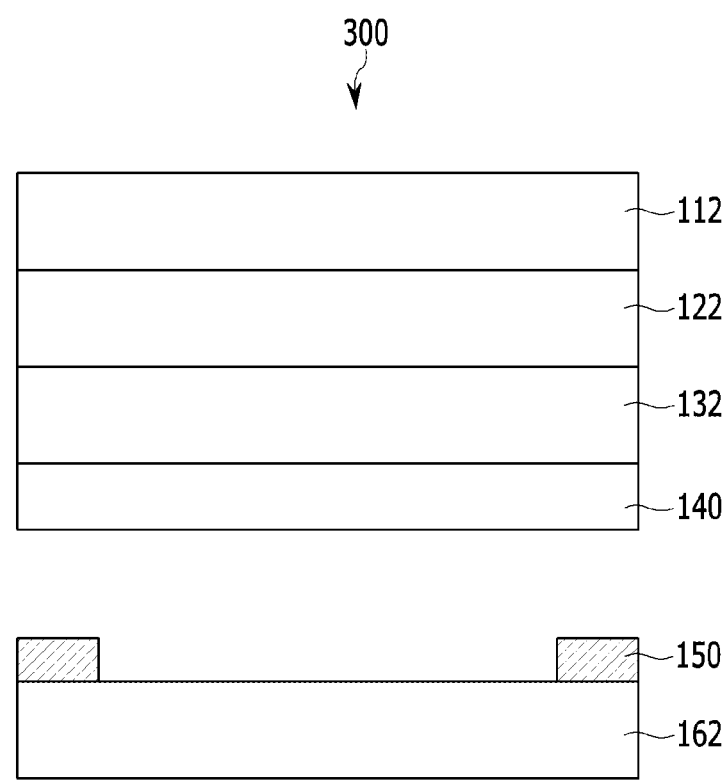
Figure 14:
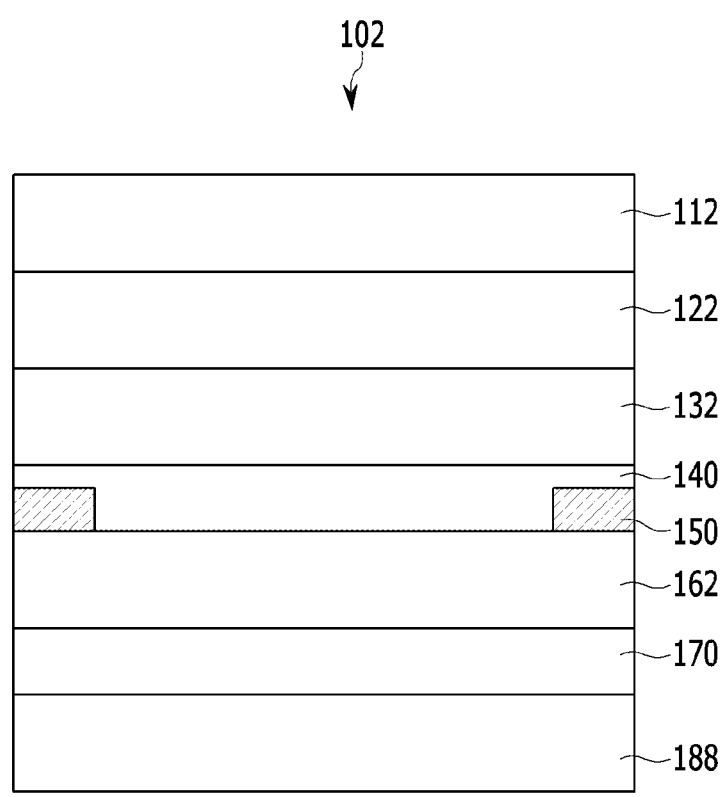

Referring to FIGS. 12 and 13, the separator 186 on the first laminated film 300 may be removed, and the first laminated film 300 with the first adhesive layer 140 and the second phase retardation roll film 162 with the light blocking layer 150 may be laminated with the first adhesive layer 140 on the first laminated film 300 by a roll-to-roll process. At this time, the light blocking layer 150 on the second phase retardation roll film 162 may face the first adhesive layer 140 on the first laminated film 300.

In an embodiment, a second adhesive layer 170 may be coated on the second phase retardation roll film 162 of a second laminated film, and a separator 188 may be attached onto the second adhesive layer 170 to form an optical roll film 102. The second adhesive layer 170 may be used in attaching the optical roll film 102 or portions of the optical roll film 102 on another device including a flat panel display, etc.

In an embodiment, the first adhesive layer 140 and the second adhesive layer 170 may include a PSA (pressure sensitive adhesive). A thickness of the first adhesive layer 140 may be in a range from about 10 μm to about 20 μm, and a thickness of the second adhesive layer 170 may be in a range from about 15 μm to about 25 μm.

Figure 15:
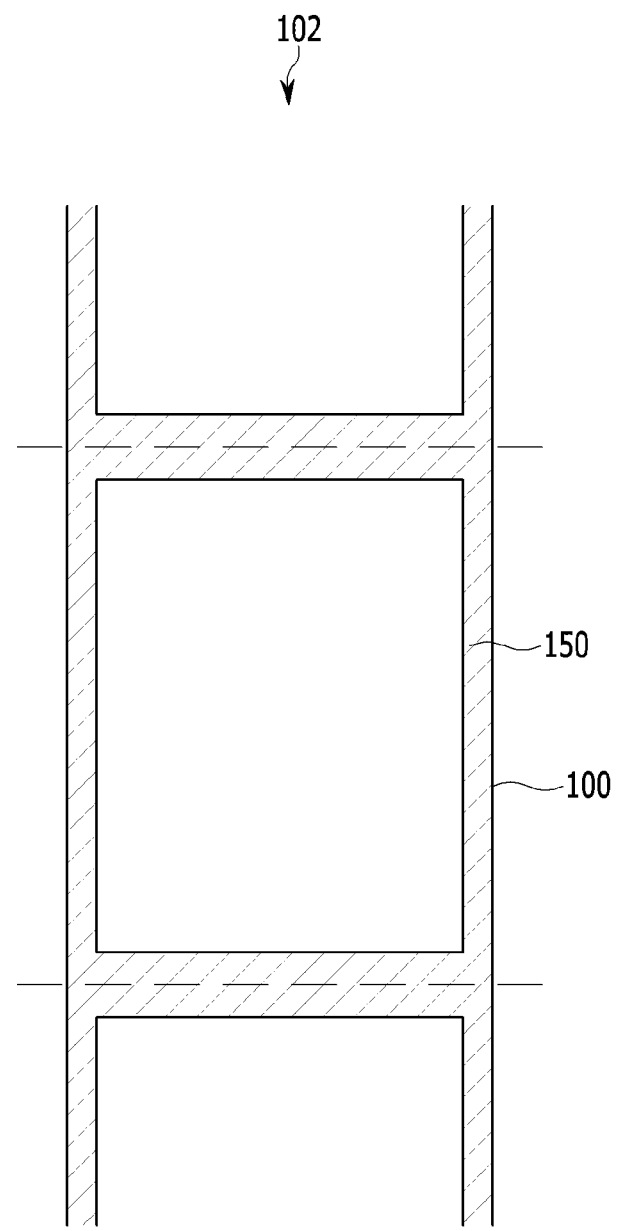

Referring to FIG. 15, the optical roll film 102 may be cut into a plurality of optical films 100.

The optical film 100 shown in FIGS. 1 to 15 may be used in a display device, for example, a liquid crystal display, an organic light emitting display, etc.

An embodiment of an organic light emitting display will be described in detail with reference to FIG. 16.

Figure 16:
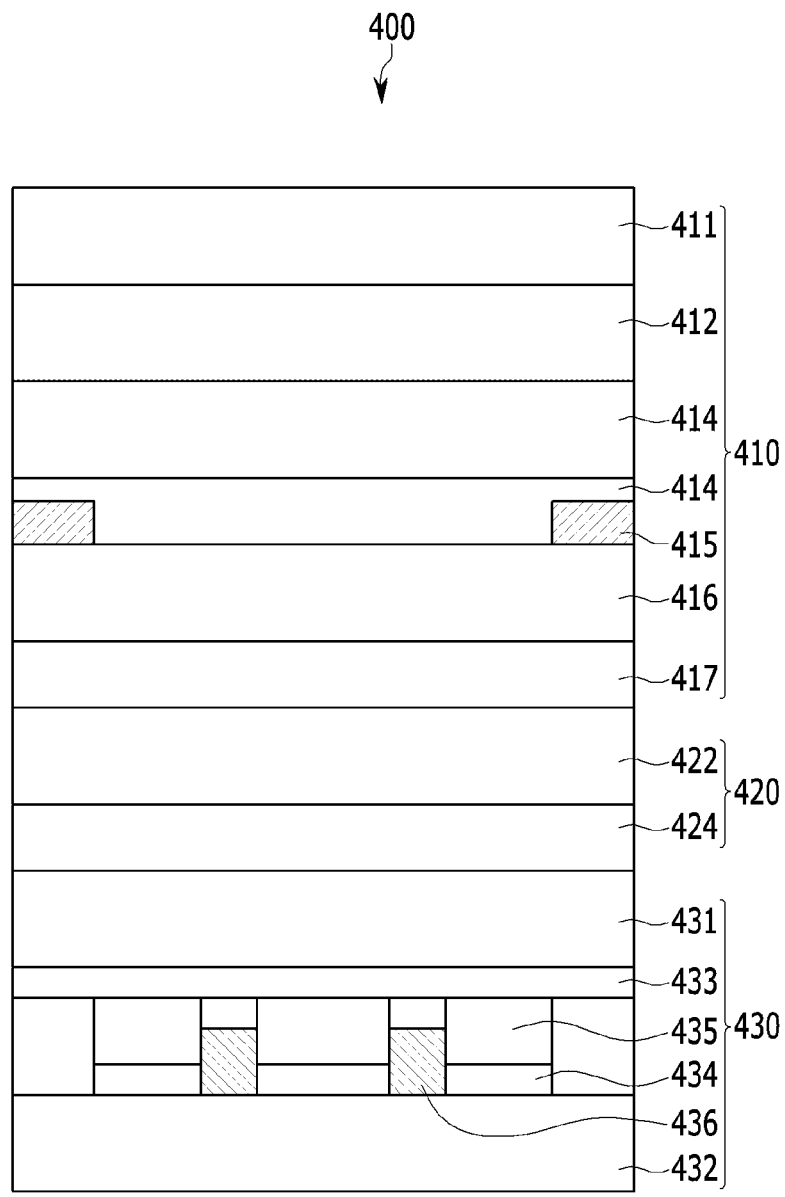
FIG. 16 is a schematic sectional view of an embodiment of an organic light emitting display according to the invention.

FIG. 16 is a schematic sectional view of an embodiment of an organic light emitting display according to the invention.

Referring to FIG. 16, an embodiment of an organic light emitting display 400 includes an organic light emitting panel 430, a color shift restraining film 420, and an optical film 410. The color shift restraining film 420 is disposed on, e.g., attached to, the organic light emitting panel 430, and the optical film 410 is disposed on, e.g., attached to, the color shift restraining film 420.

The organic light emitting panel 430 is configured to display images, and may include a pair of substrates 431 and 432, a common electrode 433, a plurality of pixel electrodes 434, a plurality of organic light emitting members 435, and a plurality of light blocking members 436.

The common electrode 433 may be disposed on an entire surface of a the substrate 431, and the plurality of pixel electrodes 434 may be disposed on another substrate 432. Each of the organic light emitting members 435 may include an organic light emitting material, may be disposed on one of the pixel electrodes 434 and the common electrode 433, and may contact the one of the pixel electrodes 434 and the common electrode 433. The light blocking members 436 may be disposed between the organic light emitting members 435, and may reduce or block light leakage between pixels.

The organic light emitting display 400 may not include a separate light blocking frame or a separate bezel that is disposed exterior the display 400 and extends along edges of the organic light emitting panel 430.

The color shift restraining film 420 may reduce or retrain a change of wavelength of light due to a resonance structure of the light emitting display device 400. The color shift restraining film 420 may include a color shift restraining layer 422 and an adhesive layer 424. The color shift restraining film 420 may be omitted.

The optical film 410 may include a passivation layer 411, a polarization layer 412, a first phase retardation layer 413, a first adhesive layer 414, a second phase retardation layer 416, and a second adhesive layer 417, which may be stacked from top to bottom. The optical film 410 may further include a light blocking layer 415 disposed between the first adhesive layer 414 and the second phase retardation layer 416. The light blocking layer 415 may be disposed at positions at which a conventional bezel or a conventional light blocking frame may be disposed. The optical film 410 shown in FIG. 16 may have substantially the same characteristics as the optical film 100 shown in FIGS. 1 to 15.

External light incident on the organic light emitting display 400 may enter into the organic light emitting panel 430 through the optical film 410, and may be reflected by a reflective member, for example, an electrode or a signal line of the organic light emitting panel 430. When the external light incident on the organic light emitting display 400 enters into the organic light emitting panel 430, the external light may be linearly polarized after passing through the polarization layer 412, and the linearly polarized external light may be retarded by about a half wavelength when passing through the first phase retardation layer 413 such that the polarization direction of the external light is changed. Thereafter, the external light may be retarded by about a quarter wavelength when passing through the second phase retardation layer 416 such that the linear polarized external light may be converted into a circular polarized light. After passing through the second phase retardation layer 416, the circularly polarized external light may be reflected by the reflective member of the organic light emitting panel 430, and then may travel towards the second phase retardation layer 416 again. The reflected light may be retarded by about a quarter wavelength when secondly passing through the second phase retardation layer 416 such that the circular polarized light may be converted back into a linear polarized light. The linearly polarized light may be retarded by about a half wavelength when secondly passing through the first phase retardation layer 413 such that the polarization direction of the light may be changed. As a result, the external light initially incident on the organic light emitting panel 430 after firstly passing through the polarization layer 412 may pass through (the first phase retardation layer 413 and) the second phase retardation layer 416 twice such that a polarization axis of the external light rotates about 90 degrees when the external light reaches the polarization layer 412 again. As a result, even when external light is reflected in the organic light emitting display 400 including the organic light emitting panel 430, leakage of the reflected light from the organic light emitting display 400 is substantially reduced or effectively prevented, thereby substantially improving the image quality of the organic light emitting display 400.

The embodiment of the optical film 410 may remain its thinness as well as including the light blocking layer 415 covering edges of the display 400.

An exemplary experiment performed with several exemplary embodiments and two comparative examples of the optical film will be described in detail.

Referring to FIG. 16, an optical film 410 including a passivation layer 411, a polarization layer 412, a first phase retardation layer 413, a first adhesive layer 414, a light blocking layer 415, a second phase retardation layer 416, and a second adhesive layer 417 was disposed on, e.g., attached to, an organic light emitting panel 430 with the second adhesion layer 417, and reflectance and color shift of the combined device were measured in an exemplary experiment.

Manufacturing First Phase Retardation Layer 413

A cyclo-olefin polymer ("COP") film (ZEONOR produced by Zeon Chemicals L.P. in Japan) was obliquely stretched in a direction at an angle of about 22.5 degrees with respect to a transverse direction that is substantially perpendicular to a proceeding direction of the COP film. The oblique stretch was performed such that an edge of the COP film was stretched in the transverse direction and an opposite edge of the COP film was stretched in the direction at an angle of about 22.5 degrees with respect to the transverse direction. For Experimental Examples 1 to 7, the in-plane retardation values and the out-of-plane retardation values of the stretched COP film (i.e., the first phase retardation film 426) shown in Table 1 were obtained at the temperature ranging from about 105° C. to about 125° C. during the stretch and with the stretching ratio ranging from about 1.3 to about 3. A surface of the first phase retardation film 426 was primer treated with silicone particles to enhance the strength of adhesion in a following process. A thickness of the first phase retardation film 426 was about 45 microns (μm).

Manufacturing Second Phase Retardation Layer 416

A styrene-butadiene rubber ("SBR") toughened poly(methyl methacrylate) (PMMA) film having negative birefringence (produced by LG CHEM, LTD. in Korea) was stretched in the transverse direction to form a second phase retardation layer 416. The SBR toughened PMMA film includes a PMMA film and SBR particles in the PMMA film. For Experimental Examples 1 to 7, the in-plane retardation values and the out-of-plane retardation values of the second phase retardation layer 416 shown in Table 1 were obtained at the temperature ranging equal to or lower than about 110° C. during the stretch. A thickness of the second phase retardation layer 416 was about 55 μm.

Manufacturing Light Blocking Layer 415

The light blocking layer 415 of black ink is printed on the second phase retardation layer 416 using gravure printing. The printing of the light blocking layer 415 was performed by KNW CO., LTD. in Korea, and a thickness of the light blocking layer 415 was about 3.5 μm.

Manufacturing Polarization Layer 412

A PVA film (PS60 produced by KURARAY CO., LTD. in Japan) was dyed with iodine at a temperature of about 27 degrees, and, thereafter, was stretched in the proceeding direction at a temperature of about 57° C. and at a stretch ratio of about six (6) to form a polarization layer 412 with a thickness of about 22 μm.

First Lamination

An aquatic adhesive of a PVA solution including water at a ratio of about 99 wt % was coated on both surfaces of the above-described polarization layer 412, and a thickness of each of the aquatic adhesive was about 200 nm. The first phase retardation layer 413, the polarization layer 412, and a passivation layer 411 were laminated with the adhesive to form a first laminated film. The passivation layer 411 was a low reflectance ("LR") film (DSG03SC-60 produced by Dai Nippon Printing ("DNP") CO., LTD in Japan) having a thickness of about 60 μm. The LR film includes a TAC base substrate and a plurality of hollow silica particles coated on the base substrate. The first phase retardation layer 413 was aligned such that the primer treated surface faces the polarization layer 412.

A surface opposite the primer-treated surface of the first phase retardation layer 413 of the first laminated film was corona treated to enhance the strength of adhesion, and an epoxy resin adhesive was coated on the corona-treated surface of the first phase retardation layer 413 to form the first adhesive layer 414 having a thickness of about 15 μm. Thereafter, a separator was attached to the first adhesive layer 414.

Second Lamination

The separator on the first laminated film was removed, and the first laminated film and the second phase retardation layer 416 were laminated with the epoxy resin adhesive on the first laminated film to form an optical film 410.

Coating of Second Adhesion Layer 417 and Film Cutting

A second adhesion layer 417 of epoxy resin adhesive having a thickness of about 25 μm was coated on the second phase retardation layer 416 of the optical film 410 manufactured by the second lamination, and a separator was attached onto the second adhesion layer 417. Thereafter, the optical film 410 with the second adhesion layer 417 and the separator was aged. Next, the optical film 410 with the second adhesion layer 417 was cut into pieces with a moving cutter.

Measurement of In-Plane Retardation and Out-of-Plane Retardation

The in-plane retardation values and in-plane retardation values of the first phase retardation layer 413 and the second phase retardation layer 416 were measured using Axoscan (produced by Axometrix, Inc.). The in-plane retardation values were scanned with varying the azimuthal angle from about zero to about 360 degrees to find out a direction in which the in-plane retardation value was a maximum. The direction of the maximum retardation value was determined as an optic axis, i.e., the slow axis of a layer 413 or 416. The refractive coefficient in the optical axis is defined as nx.

Measurement and Calculation of Reflective Characteristics

A black plate and a mirror as a organic light emitting panel 430 were prepared, and lights with illumination of about 150 lux from D65 standard light source and "A" standard light source were reflected by the black plate and the organic light emitting panel 430 to measure luminance of the reflected light using EZContrast (produced by ELDIM in France).

Next, the optical film 410 was attached on the organic light emitting panel 430 with the second adhesion layer 417, and the reflected-light luminance of the optical film 410 was measured.

At this time, for a given polar angle, the reflected-light luminance was measured with varying an azimuthal angle by a unit of about one degree from about zero to about 360 degrees, and the measured luminance values were averaged.

A reflectance of the optical film 410 was given by:

Reflectance=((average luminance of optical film)−(average luminance of black plate))/((average luminance of reflector)−(average luminance of black plate))×100

The measurement was repeatedly performed for various polar angles to obtain reflectance for corresponding polar angles.

The color shift was obtained by measuring color value of the reflected light for the optical film 410, converting the color value into a color coordinate in a Lab coordinate system, and calculating a distance ($=(a^{*2}+b^{*2})^{1/2}$) of the color coordinate from an origin ($(a^*,b^*)=(0,0)$).

Next, the reflectance and the color shift were obtained by using ACR1203 (produced by JNC TECH CO., LTD. in Korea).

The above-described processes were repeatedly performed for each of Experimental Examples 1 to 7.

Comparative Example 1

The above-described processes were applied to Comparative Example 1 except that a material for the second phase retardation layer 416 was COP that was substantially the same as the material for the first phase retardation layer 413.

Comparative Example 2

A (second) phase retardation layer 428 was formed by stretching a COP film (ZEONOR produced by Zeon Chemicals L.P. in Japan) in the transverse direction. A polarization layer 412 was formed by the above-described process for Experimental Examples, and cut into pieces. The piece of the polarization layer 412, the phase retardation layer 428, and a passivation layer 411 were aligned such that the optic axis of the phase retardation layer 428 makes an angle of about 45 degrees with the transmission axis of the piece of the polarization layer 412, and laminated like the process of the first lamination. Following processes were substantially the same as the above-described processes for Experimental Examples.

Results

The experimental conditions and results according to the Experimental Example and Comparative Examples are shown in Table 1 and Table 2.

and the lateral reflectance was also low to exhibit values less than about 6%. In view of color shift, the value for the front direction was less than 10, which is low, and the value for the lateral direction was less than 12, which is also low to exhibit nearly black.

In Comparative Examples 1 and 2, the front reflectance was low to exhibit values of less than about 3.2%. However, the color shift for the front direction is very high to show values of about 18.7 and about 19.5. Therefore, the color of the reflected light may be very different from the color of the light before the reflection in the Comparative Examples.

Table 2 shows results by using different light sources and different equipments.

TABLE 2

| Equipment | | Reflectance (%) | a* | b* | Color shift |
|---|---|---|---|---|---|
| EZ Contrast | A standard light source | 1.59 | 2.98 | −3.39 | 4.51 |
| | D65 standard light source | 1.56 | 4.46 | −4.50 | 6.33 |
| ACR1203 | | 1.63 | 2.55 | −1.47 | 2.95 |

In Table 2, the reflectance and the color shift were measured and calculated for a front view, that is, when viewed at a position of a polar angle of about 8 degrees.

Referring to Table 2, the front reflectance was low to exhibit values less than about 2%, and the front color shift was very low to show values less than 7. Therefore, regardless of the type of equipment, the outstanding results were obtained.

Accordingly, the optical film according to embodiments may have excellent optical characteristics while maintaining a small thickness, and may be applicable to a roll-to-roll mass production system.

While this disclosure has been described in connection with what is presently considered to be practical exemplary embodiments, it is to be understood that the invention is not limited to the disclosed embodiments, but, on the contrary,

TABLE 1

| | 1st layer | | 2nd layer | | Angle | | Reflectance (%) | | Color Shift | |
|---|---|---|---|---|---|---|---|---|---|---|
| | Re | Rth | Re | Rth | 1st layer | 2nd layer | front | lateral | front | lateral |
| Experimental | 260 | 218 | 130 | −100 | 22.5 | 90 | 1.8 | 4.4 | 6.8 | 10.3 |
| Experimental | 265 | 209 | 130 | −100 | 22.5 | 90 | 1.8 | 4.8 | 5.6 | 10.2 |
| Experimental | 270 | 212 | 130 | −100 | 22.5 | 90 | 1.8 | 5.1 | 4.5 | 10.8 |
| Experimental | 275 | 218 | 130 | −100 | 22.5 | 90 | 1.8 | 5.2 | 5.3 | 11.1 |
| Experimental | 280 | 226 | 130 | −100 | 22.5 | 90 | 1.9 | 5.3 | 4.5 | 10.9 |
| Experimental | 260 | 218 | 135 | −110 | 22.5 | 90 | 2.2 | 4.6 | 9.1 | 10.7 |
| Experimental | 260 | 218 | 140 | −113 | 22.5 | 90 | 2.7 | 4.6 | 9.1 | 10.4 |
| Comparative | 280 | 140 | 140 | 70 | 22.5 | 90 | 3.2 | — | 19.5 | — |
| Comparative | — | — | 140 | 70 | — | 45 | 1.9 | — | 18.7 | — |

In Table 1, "1st layer" denotes the first phase retardation layer 413, "2nd layer" denotes the second phase retardation layer 416, and "Angle" denotes an angle of the slow axis of the first phase retardation layer 413 or the second phase retardation layer 416 with respect to the transmission axis of the polarization layer 412. The reflectance and color shift were shown for a front direction at a polar angle of about 8 degrees and a lateral direction at a polar angle of about 45 degrees.

Referring to Table 1, in Experimental Examples 1 to 7, the front reflectance was low to show values less than about 3%, is intended to cover various modifications and equivalent arrangements included within the spirit and scope of the appended claims.

What is claimed is:

1. An optical film comprising:
   a polarization layer;
   a first phase retardation layer;
   a second phase retardation layer; and
   a light blocking layer disposed between the first phase retardation layer and the second phase retardation layer and extending along a circumference of the second phase retardation layer to block light transmission at the circumference of the second phase retardation layer, wherein the polarization layer is disposed on the first phase retardation, the first phase retardation layer is disposed on the second phase retardation layer, an in-plane retardation value of the first phase retardation layer at a standard wavelength of about 550 nanometers is in a range from about 240 nanometers to about 300 nanometers, an in-plane retardation value of the second phase retardation layer at the standard wavelength is in a range from about 110 nanometers to about 160 nanometers, and an entire portion of an area surrounded by the light blocking layer allows light transmission between the first phase retardation layer and the second phase retardation layer.

2. The optical film of claim 1, further comprising an adhesive layer disposed between the first phase retardation layer and the second phase retardation layer and between the first phase retardation layer and the light blocking layer.

3. The optical film of claim 2, wherein the light blocking layer has a thickness less than a thickness of the adhesive layer.

4. The optical film of claim 3, wherein
the thickness of the light blocking layer is equal to or greater than about 3 micrometers and less than about 10 micrometers, and
the thickness of the adhesive layer is in a range from about 10 micrometers to about 20 micrometers.

5. The optical film of claim 1, wherein
the in-plane retardation value of the first phase retardation layer at the standard wavelength is in a range from about 260 nanometers to about 280 nanometers, and
the in-plane retardation value of the second phase retardation layer at the standard wavelength is in a range from about 130 nanometers to about 140 nanometers.

6. The optical film of claim 1, wherein an out-of-plane retardation value of the first phase retardation layer at the standard wavelength and an out-of-plane retardation value of the second phase retardation layer at the standard wavelength have opposite signs.

7. The optical film of claim 6, wherein
the out-of-plane retardation value of the first phase retardation layer at the standard wavelength is in a range from about 200 nanometers to about 230 nanometers, and
the out-of-plane retardation value of the second phase retardation layer at the standard wavelength is in a range from about −120 nanometers to about −90 nanometers.

8. The optical film of claim 1, wherein
the first phase retardation layer has an optic axis at an angle in a range from about 17 degrees to about 27 degrees or from about −27 degrees to about −17 degrees with respect to a transmission axis of the polarization layer, and
the first phase retardation layer has an optic axis at an angle in a range from about 85 degrees to about 95 degrees with respect to the transmission axis of the polarization layer.

9. The optical film of claim 1, wherein
the first phase retardation layer has a short-wavelength dispersion value in a range from about 1.00 to about 1.05, the second phase retardation layer has a short-wavelength dispersion value in a range from about 1.00 to about 1.20, the first phase retardation layer has a long-wavelength dispersion value in a range from about 0.95 to about 1.00, and the second phase retardation layer has a long-wavelength dispersion value in a range from about 0.85 to about 1.00.

10. The optical film of claim 1, wherein at least one of the first phase retardation layer and the second phase retardation layer comprises at least one of a cyclo-olefin polymer, polyacrylate, polycarbonate, polystyrene, polyethylene terephthalate and a cellulose-based polymer.

11. The optical film of claim 1, wherein
the polarization layer includes a first roll film extending in a first direction substantially perpendicular to the transmission axis,
the first phase retardation layer includes a second roll film extending in the first direction, having an optic axis at an angle in a range from about 17 degrees to about 27 degrees or from about −27 degrees to about −17 degrees with respect to a second direction substantially perpendicular to the first direction, and disposed on the first roll film, and
the second phase retardation layer includes a third roll film extending in the first direction, having an optic axis at an angle in a range from about 85 degrees to about 95 degrees with respect to the second direction, and disposed on the second roll film.

12. A method of manufacturing an optical film, the method comprising:
laminating a passivation roll film and a half-wave roll film on respective surfaces of a polarization roll film to form a first laminated film;
printing a light blocking layer on a quarter-wave roll film;
unrolling a roll of the first laminated film;
unrolling a roll of the quarter-wave roll film;
laminating the unrolled first laminated film and the unrolled quarter-wave roll film with the light blocking layer such that the light blocking layer is disposed between the half-wave roll film and the quarter-wave roll film; and
cutting the lamination of the first laminated film and the quarter-wave roll film.

13. The method of claim 12, further comprising:
coating an adhesive layer on the half-wave roll film in the first laminated film,
wherein the first laminated film and the quarter-wave roll film with the light blocking layer is laminated with the adhesive layer.

14. The method of claim 13, wherein the light blocking layer has a thickness less than a thickness of the adhesive layer.

15. The method of claim 14, wherein
the thickness of the light blocking layer is equal to or greater than about 3 micrometers and less than about 10 micrometers, and
the thickness of the adhesive layer is in a range from about 10 micrometers to about 20 micrometers.

16. The method of claim 12, further comprising:
stretching the half-wave roll film in a direction at an angle in a range from about 17 degrees to about 27 degrees or from about −27 degrees to about −17 degrees with respect to a direction substantially perpendicular to a proceeding direction of the half-wave roll film; and stretching the quarter-wave roll film in a direction at an angle in a range from about 85 degrees to about 95 degrees with respect to a direction substantially perpendicular to a proceeding direction of the quarter-wave roll film.

17. The method of claim 16, wherein an out-of-plane retardation value of the stretched half-wave roll film at the standard wavelength and an out-of-plane retardation value of the stretched quarter-wave roll film at the standard wavelength have opposite signs.

18. A display device comprising:
a display panel; and
an optical film disposed on the display panel,
wherein the optical film comprises:
  a polarization layer;
  a first phase retardation layer;
  a second phase retardation layer; and
  a light blocking layer disposed between the first phase retardation layer and the second phase retardation layer and extending along a circumference of the second phase retardation layer,
wherein the polarization layer is disposed on the first phase retardation,
the first phase retardation layer is disposed on the second phase retardation layer,
an in-plane retardation value of the first phase retardation layer at a standard wavelength of about 550 nanometers is in a range from about 240 nanometers to about 300 nanometers,
an in-plane retardation value of the second phase retardation layer at the standard wavelength is in a range from about 110 nanometers to about 160 nanometers, and
the light blocking layer reaches an edge of the display panel.

19. The display device of claim 18, further comprising an adhesive layer disposed between the first phase retardation layer and the second phase retardation layer and between the first phase retardation layer and the light blocking layer.

20. The display device of claim 19, wherein the light blocking layer has a thickness equal to or greater than about 3 micrometers and less than a thickness of the adhesive layer.

* * * * *